US010810517B2

(12) United States Patent
Xu et al.

(10) Patent No.: US 10,810,517 B2
(45) Date of Patent: Oct. 20, 2020

(54) FLASH CONTROL METHOD AND APPARATUS

(71) Applicant: Huawei Technologies Co., Ltd., Shenzhen (CN)

(72) Inventors: Jing Xu, Shanghai (CN); Zhishan Zhuang, Shanghai (CN); Xiaochen Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 232 days.

(21) Appl. No.: 16/080,874

(22) PCT Filed: Jul. 18, 2016

(86) PCT No.: PCT/CN2016/090302
§ 371 (c)(1),
(2) Date: Aug. 29, 2018

(87) PCT Pub. No.: WO2018/014159
PCT Pub. Date: Jan. 25, 2018

(65) Prior Publication Data
US 2019/0065998 A1 Feb. 28, 2019

(51) Int. Cl.

| | |
|---|---|
| ***G06F 17/00*** | (2019.01) |
| ***G06Q 10/02*** | (2012.01) |
| ***H04N 5/232*** | (2006.01) |
| ***H04M 1/725*** | (2006.01) |
| ***G06F 1/16*** | (2006.01) |

(Continued)

(52) U.S. Cl.
CPC ........... *G06Q 10/02* (2013.01); *G06F 1/1686* (2013.01); *G06Q 40/04* (2013.01); *H04M 1/72569* (2013.01); *H04N 5/232* (2013.01); *H04M 2250/52* (2013.01); *H04N 5/2256* (2013.01)

(58) Field of Classification Search
USPC ........................................................ 235/375
See application file for complete search history.

(56) References Cited

U.S. PATENT DOCUMENTS

2007/0173297 A1 7/2007 Cho et al.
2008/0084024 A1 * 4/2008 Streeter ................ A63F 3/0645 273/139
2009/0083627 A1 3/2009 Onda et al.
(Continued)

FOREIGN PATENT DOCUMENTS

CN 101281535 A 10/2008
CN 103200330 A 7/2013
(Continued)

OTHER PUBLICATIONS

Machine Translation and Abstract of Chinese Publication No. CN104954558, Sep. 30, 2015, 14 pages.
(Continued)

*Primary Examiner* — Tuyen K Vo
(74) *Attorney, Agent, or Firm* — Conley Rose, P.C.

(57) ABSTRACT

A flash control method, includes detecting a view operation of electronic ticket information, obtaining a view time of the view operation and corresponding target electronic ticket information, obtaining an effective time range included in the target electronic ticket information, and controlling a flash component to start lighting when the view time matches the effective time range.

20 Claims, 7 Drawing Sheets

S102
Detect a view operation of electronic ticket information, and obtain a view time of the view operation and corresponding target electronic ticket information
S104
Obtain an effective time range included in the target electronic ticket information
S106
Determine whether the view time matches the effective time range
No
Yes
S108
Control a flash component to start lighting
S110
Perform no processing

(51) Int. Cl.
*G06Q 40/04* (2012.01)
*H04N 5/225* (2006.01)

(56) References Cited

U.S. PATENT DOCUMENTS

| | | | | |
|---|---|---|---|---|
| 2009/0207301 | A1* | 8/2009 | Fransson | H04N 5/232 348/371 |
| 2009/0263117 | A1* | 10/2009 | Brosnan | H04N 5/2256 396/155 |
| 2014/0022385 | A1* | 1/2014 | Fischer | G08B 17/125 348/143 |
| 2014/0340573 | A1* | 11/2014 | Clawson | H04M 1/185 348/371 |
| 2015/0205980 | A1 | 7/2015 | Kikuchi | |
| 2015/0271325 | A1* | 9/2015 | Lee | H04W 4/80 455/414.1 |
| 2016/0292481 | A1 | 10/2016 | Igarashi et al. | |

FOREIGN PATENT DOCUMENTS

| | | | |
|---|---|---|---|
| CN | 104954558 | A | 9/2015 |
| CN | 105072271 | A | 11/2015 |
| CN | 105432150 | A | 3/2016 |
| CN | 105608555 | A | 5/2016 |
| CN | 105849746 | A | 8/2016 |
| KR | 20130037635 | A | 4/2013 |

OTHER PUBLICATIONS

Machine Translation and Abstract of Chinese Publication No. CN105432150, Mar. 23, 2016, 44 pages.

Foreign Communication From a Counterpart Application, Chinese Application No. 201680059911.9, Chinese Office Action dated May 17, 2019, 7 pages.

Machine Translation and Abstract of Chinese Publication No. CN103200330, Jul. 10, 2013, 11 pages.

Machine Translation and Abstract of Chinese Publication No. CN105072271, Nov. 18, 2015, 10 pages.

Machine Translation and Abstract of Chinese Publication No. CN105608555, May 25, 2016, 12 pages.

Machine Translation and Abstract of Korean Publication No. KR20130037635, Apr. 16, 2013, 35 pages.

Foreign Communication From a Counterpart Application, PCT Application No. PCT/CN2016/090302, English Translation of International Search Report dated Mar. 20, 2017, 2 pages.

* cited by examiner

FLASH CONTROL METHOD AND APPARATUS

CROSS-REFERENCE TO RELATED APPLICATIONS

This application is a U.S. National Stage Application of International Patent Application No. PCT/CN2016/090302, filed on Jul. 18, 2016, which is hereby in cooperated by reference in its entirety.

TECHNICAL FIELD

The present invention relates to the field of intelligent terminal technologies, and in particular, to a flash control method and apparatus.

BACKGROUND

With development of intelligent terminal technologies, an intelligent terminal is usually equipped with a flash device. The flash device may provide a light source for a camera or another photographing application at a shutter time, and may also be independently turned on or turned off as a lighting tool.

In a conventional technology, an intelligent operating system of a touch-screen intelligent terminal provides an application programming interface API for controlling a flash to be turned on or turned off. A user may manually turn on or turn off the flash device by touching or pressing a virtual button on the intelligent terminal.

However, in a research, the inventor finds that an input entrance of the flash control interface provided by the touch-screen intelligent terminal in the conventional technology is relatively complex. For example, on a touch-screen smartphone, a user needs to open multiple system menus (for example, the user usually needs to first open the multiple system menus) or run a flash control application to find a virtual control button of a flash. Therefore, in an application environment in which the user needs to immediately turn on the flash, the flash cannot automatically adapt to an environment change to start lighting, and the user cannot quickly control the flash for lighting. As a result, an operation is not convenient enough.

SUMMARY

Based on this, to resolve the foregoing problem in the conventional technology that a flash operation is not convenient enough because a user needs to start a flash control application before turning on a flash, a flash control method is particularly provided.

A first aspect of embodiments of the present invention discloses a flash control method, including: detecting a view operation of electronic ticket information, and obtaining a view time of the view operation and corresponding target electronic ticket information, where the view time is a current system time at which a user taps and views a target electronic ticket; obtaining an effective time range included in the target electronic ticket information, where for example, if the target electronic ticket is an electronic movie ticket, an effective time range of the electronic movie ticket is a show time of a movie showing corresponding to the electronic movie ticket, and the show time is stored in the electronic movie ticket; and if it is determined that the view time matches the effective time range, controlling a flash component to start lighting, that is, identifying whether the user has a requirement for turning on the flash by determining whether the view time of the electronic ticket matches the effective time range of the electronic ticket, and then turning on the flash for lighting.

With reference to the content in the first aspect of the embodiments of the present invention, in a first possible implementation of the first aspect, before the controlling a flash component to start lighting, the method further includes:

detecting a tilt angle by using an acceleration sensor; and if it is determined that the tilt angle belongs to a first threshold range and the view time matches the effective time range, executing the controlling a flash component to start lighting. The acceleration sensor in a terminal can detect the tilt angle of the terminal. When the user is looking for a seat or a location, the terminal is usually in a horizontal state when the electronic ticket is viewed on the terminal. Therefore, the tilt angle of the terminal may also be considered for identifying whether the user is looking for the seat and has a requirement for turning on the flash. In addition, the terminal turns on the flash for lighting only when the view time at which the user views the electronic ticket matches the effective time range of the electronic ticket and the tilt angle of the terminal belongs to the first threshold range. This increases accuracy of identifying whether the user has a requirement for turning on the electronic ticket.

With reference to the first aspect and the first possible implementation of the first aspect of the embodiments of the present invention, in a second possible implementation of the first aspect, after the controlling a flash component to start lighting, the method further includes:

detecting a tilt angle by using the acceleration sensor, and if it is determined that the tilt angle belongs to a second threshold range, controlling the flash component to stop lighting. That is, when the user puts away a mobile phone after finding the seat or the location and sitting down, the terminal may automatically identify, according to whether the detected tilt angle is perpendicular or approximately perpendicular, that a user requirement for using the flash has been completed and the flash can be turned off, so that the terminal can automatically turn off the flash according to a user requirement. In this way, user operations are reduced, and the terminal becomes more power-saving.

With reference to the first aspect and the second possible implementation of the first aspect of the embodiments of the present invention, in a third possible implementation of the first aspect, before the controlling a flash component to start lighting, the method further includes:

obtaining target location information included in the target electronic ticket information, and obtaining, by using a positioning system, location information of a place in which the view operation occurs, where the place in which the view operation occurs is a geographical location in which the terminal is located when the user taps and views the electronic ticket; and executing the controlling a flash component to start lighting if it is determined that the location information of the place in which the view operation occurs matches the target location information and the view time matches the effective time range. The terminal turns on the flash for lighting only when the view time at which the user views the electronic ticket matches the effective time range of the electronic ticket and the geographical location in which the terminal is located when the user views the electronic ticket matches a target geographical location defined in the electronic ticket. This increases accuracy of identifying whether the user has a requirement for turning on the electronic ticket.

With reference to the first aspect and the first to the third possible implementations of the first aspect of the embodiments of the present invention, in a fourth possible implementation of the first aspect, after the detecting a view operation of electronic ticket information, the method further includes:

presenting the target electronic ticket information on a display screen; and when it is detected that a virtual button is triggered, controlling the flash component to start lighting, where the virtual button is disposed in a presentation area on the display screen for the target electronic ticket information. That is, the virtual button is disposed in a location for presenting the electronic ticket on the display screen, and the user can turn on or turn off the flash by tapping the virtual button, and therefore does not need to switch to another application for controlling the flash. This increases operation convenience.

With reference to the first aspect and the first to the fourth possible implementations of the first aspect of the embodiments of the present invention, in a fifth possible implementation of the first aspect, the controlling a flash component to start lighting includes:

detecting ambient light intensity by using an ambient light sensor, and adjusting lighting luminance of the flash component according to the detected ambient light intensity. That is, when turning on the flash, the terminal may adjust the luminance of the flash according to the ambient light intensity, and may increase the luminance of the flash if ambient light is relatively weak, or may reduce the luminance of the flash if ambient light is strong.

With reference to the first aspect and the first to the fifth possible implementations of the first aspect of the embodiments of the present invention, in a sixth possible implementation of the first aspect, after the controlling a flash component to start lighting, the method further includes:

skipping detecting a lock screen event of an operating system, and after the flash component stops lighting, resuming detecting a lock screen event of the operating system. That is, after the flash component starts lighting, because the user is looking for the seat according to the electronic ticket, if a lock screen event is shielded in this case, the terminal cannot enter a lock screen state, so that the display screen keeps presenting content of the electronic ticket. Therefore, the user can conveniently view the electronic ticket, improving convenience.

With reference to the first aspect and the first to the sixth possible implementations of the first aspect of the embodiments of the present invention, in a seventh possible implementation of the first aspect, after the detecting a view operation of electronic ticket information, the method further includes: broadcasting the target electronic ticket information by using voice.

With reference to the first aspect and the first to the seventh possible implementations of the first aspect of the embodiments of the present invention, in an eighth possible implementation of the first aspect, before the detecting a view operation of electronic ticket information, the method further includes: receiving a service reservation SMS message, parsing the service reservation SMS message, generating the electronic ticket information according to information obtained by means of parsing, and storing the electronic ticket information. The user is not notified of offline service subscription information of some O2O applications by using an electronic ticket; instead, the user is notified only by using an SMS message. Then, the terminal may automatically generate an electronic ticket after parsing the SMS message, and store the electronic ticket on the terminal, so that service credentials of various O2O applications can be managed on the terminal.

With reference to the first aspect and the first to the seventh possible implementations of the first aspect of the embodiments of the present invention, in a ninth possible implementation of the first aspect, the method further includes:

generating a corresponding scheduled notification task according to the stored electronic ticket information, where a notification time of the scheduled notification task is a moment that is preset duration ahead of an effective time of the electronic ticket information corresponding to the scheduled notification task, and notification content of the scheduled notification task is to indicate that the electronic ticket information is to take effect; and performing notification according to the scheduled notification task if it is determined that the notification time of the scheduled notification task arrives. Electronic tickets in an O2O application are all service credentials, and therefore have service effective times. That is, the terminal automatically detects an electronic ticket whose service effective time is to elapse, and then notifies the user by using a notification bar or a pop-up window, to prompt the user to perform consumption as soon as possible to avoid missing a service deadline. This improves operation convenience.

In addition, to resolve the foregoing problem in the conventional technology that a flash operation is not convenient enough because a user needs to start a flash control application before turning on a flash, a second aspect of the embodiments of the present invention further discloses a flash control apparatus, configured to execute the foregoing flash control method.

In addition, to resolve the foregoing problem in the conventional technology that a flash operation is not convenient enough because a user needs to start a flash control application before turning on a flash, a third aspect of the embodiments of the present invention further discloses a terminal. The terminal includes a network interface, a processor, a storage, and a flash component. The storage stores a group of program code. The processor is configured to invoke the program code stored in the storage, to perform corresponding operation steps in the foregoing flash control method.

To sum up, implementation of the embodiments of the present invention has the following beneficial effects:

In the foregoing flash control method and apparatus, the user requirement for turning on the flash is determined based on the electronic ticket of the O2O application and by detecting an operation of viewing the electronic ticket by the user; when the view time belongs to the effective time range of the electronic ticket, the flash is automatically controlled to be turned on, and the user does not need to perform complex operations of switching to a flash application and then tapping a button to turn on the flash. Therefore, operation steps are reduced, and operation convenience is improved.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To resolve the foregoing problem in the conventional technology that a flash operation is not convenient enough because a user needs to start a flash control application before turning on a flash, a flash control method is particularly provided. The method may be executed depending on a computer program. The computer program may run on a mobile terminal or an intelligent terminal that is based on a Von Neumann system. The computer program may be an O2O (English: Online To Offline, Chinese: Online To Offline) application program on the mobile terminal or the intelligent terminal, or an application program such as an instant messaging application or a social network application that supports a function of viewing an electronic ticket generated by an O2O application.

An electronic ticket is a data structure, in an O2O application, used to store ticket service data related to an O2O service, or may be a data object, in an O2O application based on an object-oriented program language, used to store ticket service data related to an O2O service. For example, in an O2O application for purchasing a movie ticket online, a user may purchase a movie ticket online. After the user pays, the O2O application for purchasing a movie ticket online generates a data structure or a data object that includes information of the movie ticket purchased by the user. The data structure or the data object may include movie-related information content, such as an electronic credential (for example, a verification code including a string of characters or numbers) used for offline exchange for a physical movie ticket or offline identity verification, a cinema name, a movie name, a show time, a cinema hall number, and an effective period. The data structure or the data object is an electronic ticket generated by the O2O application for purchasing a movie ticket online.

Figure 1:
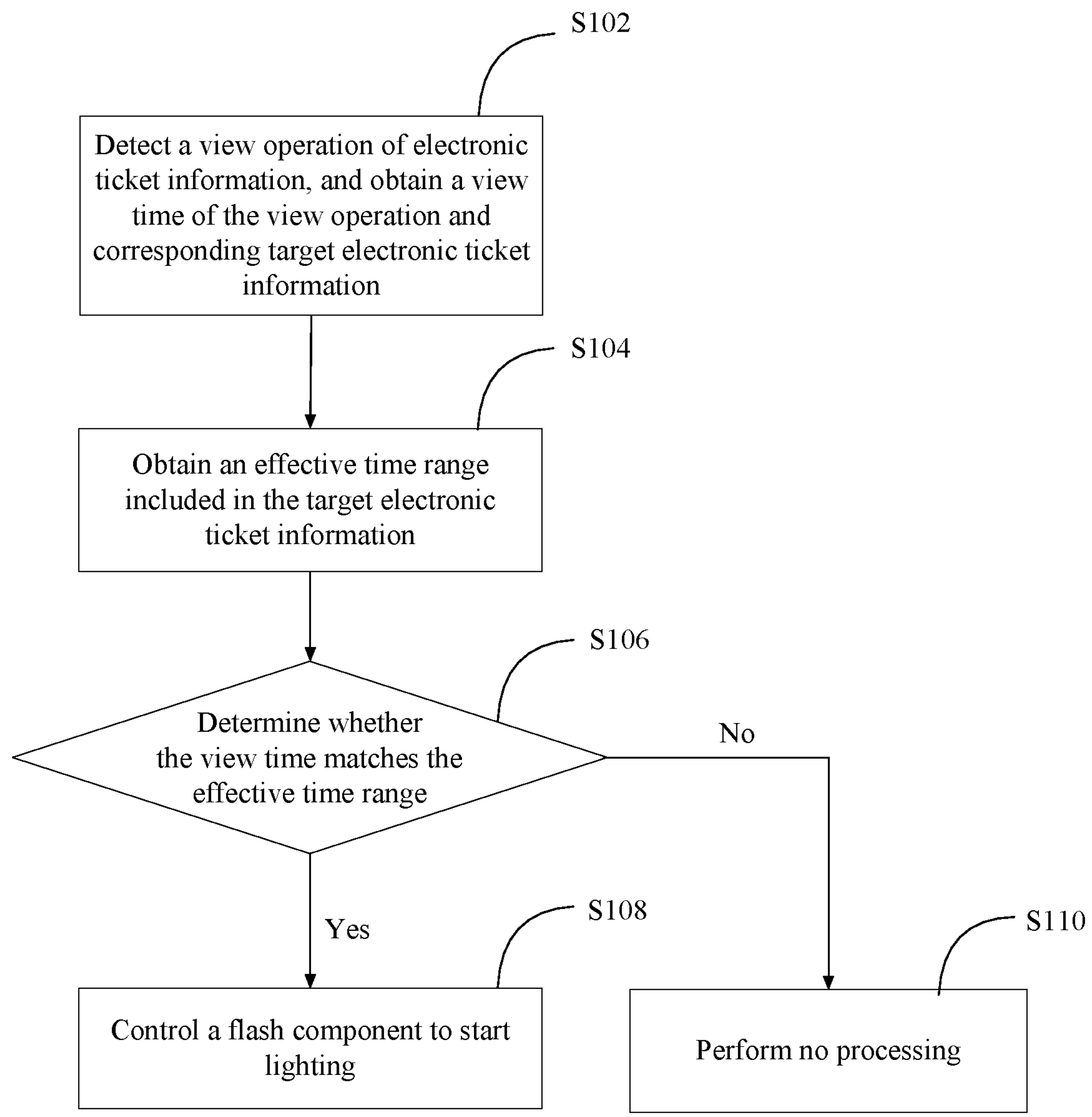
FIG. 1 is a flowchart of a flash control method according to an embodiment of the present invention.

In this embodiment, in the flash control method, controlling is performed mainly based on an electronic ticket generated by an O2O application. Specifically, as shown in FIG. 1, the flash control method includes the following steps.

Step S102: Detect a view operation of electronic ticket information, and obtain a view time of the view operation and corresponding target electronic ticket information.

After a server program of an O2O application for purchasing a movie ticket online generates an electronic ticket, if a user needs to view the electronic ticket, an O2O application server sends the electronic ticket to a terminal held by the user, and the user may view the electronic ticket by using a carrier such as a client program of the O2O application or a browser.

Figure 2:
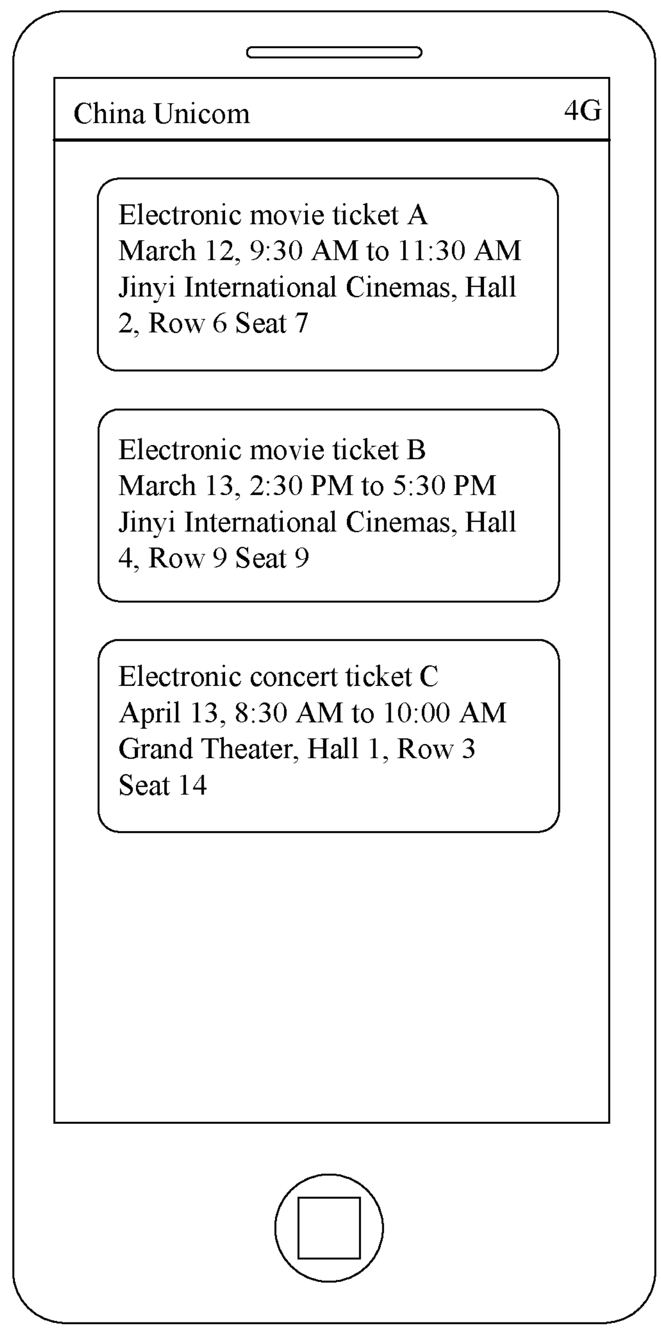
FIG. 2 is a diagram of a screen on which electronic ticket information stored on a terminal is presented in a list according to an embodiment of the present invention.
Figure 3:
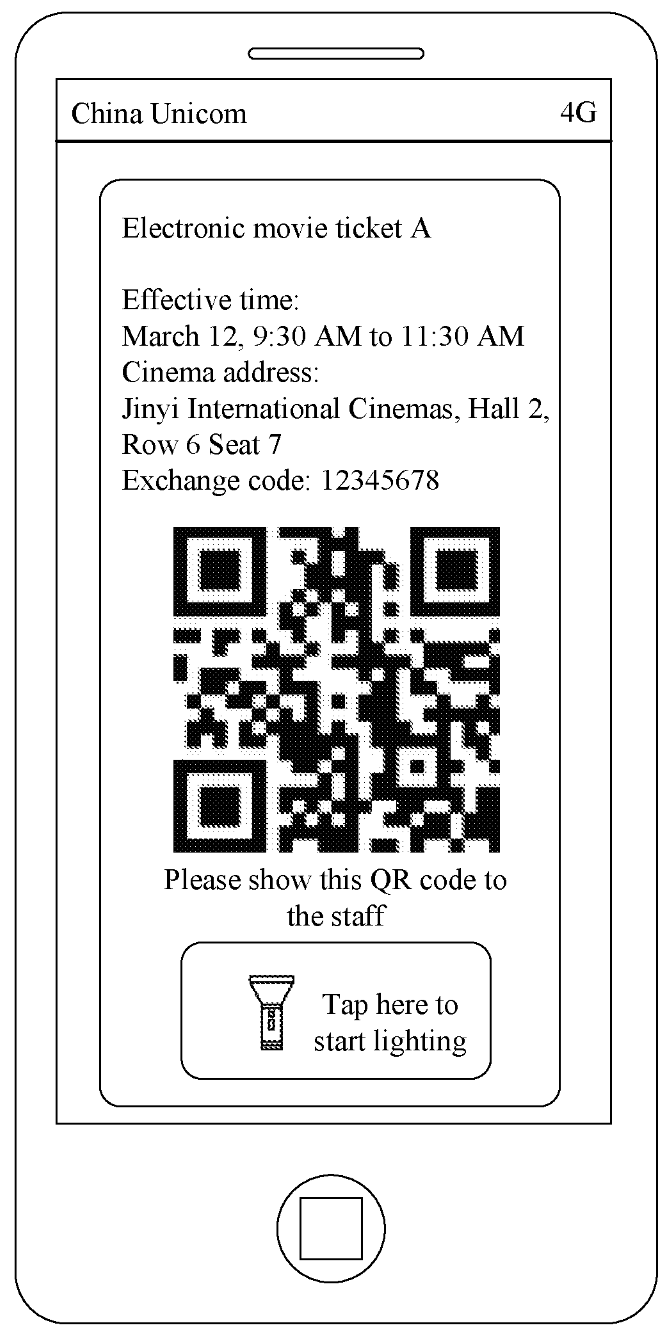
FIG. 3 is a schematic diagram of a screen on which a user views details of electronic ticket information according to an embodiment of the present invention.

For example, referring to FIG. 2, the terminal may present, in a list component of a window by using an O2O application client, a list of electronic tickets held by the login user. List entries in the list are corresponding to the electronic tickets, and brief information of the electronic tickets corresponding to the list entries may be presented in the list entries. For example, only a name of an offline agency related to an O2O service (such as a cinema name) and a name of an offline service purchased by the login user (such as a movie name) are presented. If the user needs to view detailed electronic ticket information, the user needs to tap a corresponding list entry in the window of the O2O application client, and enter a corresponding electronic ticket view instruction or trigger a corresponding electronic ticket view event. Then, the mobile terminal may present a corresponding electronic ticket by using a screen component. Referring to FIG. 3, after the user taps an electronic movie ticket A, detailed information of the electronic movie ticket A is presented.

That is, the terminal may obtain a corresponding target electronic ticket that is being viewed by the user by detecting an electronic ticket view instruction entered on a display screen or an electronic ticket view event triggered by a user operation. A time stamp at which the entered electronic ticket view instruction or the electronic ticket view event triggered by the user operation is detected is a view time corresponding to a view operation of electronic ticket information.

In addition, in FIG. 3, QR code information of the electronic ticket is further presented (refer to a QR code picture in a diagram of a screen in FIG. 3). The user may also obtain the QR code picture of the electronic ticket by means of a screenshot. When the user uses an offline service of the O2O application, the user presents the QR code picture obtained by means of a screenshot to offline service staff of the O2O application for scanning, or directly scans the QR code picture on an offline service terminal of the O2O application, to determine an identity of the user and a type of a service that can be used by the user. Therefore, the electronic ticket can be conveniently verified offline.

Step S104: Obtain an effective time range included in the target electronic ticket information.

In this embodiment, the target electronic ticket is cached in a terminal device that executes the method, and is stored in a memory in a predefined data structure. Alternatively, the target electronic ticket is permanently stored in a predefined file format, and is loaded, during running, to a memory by means of reading a file. The effective time range in the electronic ticket information may be stored in an attribute item of the data structure of the electronic ticket. The terminal may obtain the effective time range included in the electronic ticket by reading the attribute item predefined in the data structure of the electronic ticket stored in the memory. In another embodiment, the electronic ticket information may alternatively be stored on the O2O application server. When the user views the electronic ticket, the terminal may send, to the O2O application server, a query request corresponding to the effective time range, to obtain the effective time range returned by the O2O application server. Alternatively, after reserving a movie ticket by using a mobile phone, the user receives a movie ticket confirmation SMS message. The SMS message may include a show time, a cinema name, and the like. The mobile phone may obtain an effective time range by reading content in the SMS message.

In an O2O application, each offline service purchased by a user includes an effective time range. For example, in an online movie ticket O2O application, an effective time range is a time range in which a movie is played. If playing of the movie starts at 9:00 and ends at 11:00, the effective time range is 9:00 to 11:00. For another example, in an O2O application of a theater, if an effective period of an electronic ticket purchased online by a user is a current day and there are three times of playing in the theater everyday during 10:00 to 11:00, 13:00 to 15:00, and 19:00 to 20:00, an effective time range includes three time ranges: [10, 11], [13, 15], and [19, 20].

Step S106: Determine whether the view time matches the effective time range; and if yes, perform step S108: when the view time matches the effective time range, control a flash component to start lighting; otherwise, perform step S110: perform no processing.

As described above, the view time is a time at which the user opens and views the electronic ticket, and the effective time range is a time range in which a ticket included in the electronic ticket takes effect. In this embodiment, if the view time belongs to the effective time range, it is determined that the view time matches the effective time range. In another embodiment, an error is allowable. If duration by which the view time exceeds the effective time range is within a preset error range, it may also be determined that the view time matches the effective time range.

In this embodiment, if it is determined that the view time matches the effective time range, the flash component may be controlled to start lighting. On a terminal such as a mobile phone, a flash component physically includes an LED light that serves as a light source and a driver circuit that controls the LED light, and further logically includes a flash driver program interface in an operating system of the mobile phone. The terminal may invoke the driver program interface of the flash component, and control, by using the driver circuit of the flash component, a flash to start lighting. If it is determined that the view time does not match the effective time range, the flash on the terminal is not turned on for lighting.

That is, if the terminal detects that the user is viewing the electronic ticket and detects that a current time (that is, the view time of the electronic ticket) is in the effective time range, it indicates that the user is probably located in an offline service providing place corresponding to an O2O service, has obtained a corresponding paper ticket by means of exchange, and needs to view content of the paper ticket or view an environment of the offline service place. That is, the terminal determines that the user probably has a requirement for turning on the flash for lighting. In this case, the flash on the mobile terminal may be controlled to automatically start lighting, and the user may learn details of an O2O offline service by lighting up the paper ticket by using the flash. Alternatively, the user observes the environment of the offline service place by using lighting of the flash.

For example, in an online movie ticket O2O application scenario, a user purchases a movie ticket credential online, and therefore obtains a corresponding electronic ticket generated by an O2O application. When the user enters a cinema at a movie playing time to watch a movie, a terminal automatically controls a flash to start lighting because the terminal detects that a current moment (that is, a view time of the electronic ticket) is in an effective time range of the electronic ticket (that is, a movie playing time range). After lighting is started, the user may quickly view content on a paper ticket in the dark cinema, light up a surrounding environment by using the flash, and view a number on a real seat. This helps the movie-watching user quickly find a seat purchased by the movie-watching user and quickly enter a movie watching state.

It can be learned from the foregoing example that when the user uses an offline service of an O2O application, the user does not need to manually switch to a flash control application; instead, the terminal automatically controls, by detecting a user behavior of viewing the electronic ticket, the flash to be turned on, so that a user operation is more convenient. In this embodiment, the method for controlling the flash to be turned on may be executed by invoking a flash driver program of an operating system. Preferably, a flash-on duration threshold may be preset. When it is detected that an on time of the flash exceeds the preset flash-on duration threshold, the flash is automatically turned off to stop lighting. In this way, the user does not need to perform an operation of turning off the flash, so that a user operation is more convenient.

Further, a user usually uses an offline service of an O2O application ahead of time, that is, the user arrives at a place ahead of time. Therefore, when it is determined whether a view time of an electronic ticket matches an effective time range of the electronic ticket, the effective range of the electronic ticket may further be extended, that is, a specific error is allowable. If a view time belongs to the effective time range of the electronic ticket and a preset error range, a flash is also turned on for lighting.

For example, in the foregoing example, if the effective time range is 9:00 to 11:00 and the error range is 10 minutes earlier or later, when the user enters a cinema hall and views the corresponding electronic ticket at 8:53, the flash can still be controlled to start lighting because 8:53 belongs to the effective time range of the electronic ticket and the preset error range (that is, belongs to a range of 10 minutes earlier than 9:00 to 11:10). Therefore, even if a movie is not yet played in this case, when the user arrives at the cinema hall ahead of time, the flash can still be automatically turned on to perform lighting for the user. This provides convenience.

To further identify a user requirement for lighting up an environment, in an embodiment, when the flash component is controlled to start lighting, a tilt angle may be further obtained by using an acceleration sensor, and the flash component is controlled to start lighting when the tilt angle belongs to a first threshold range.

When a user expects to start lighting in an offline service place of an O2O application, the user usually expects to use lighting to observe a seat number, a paper ticket, and the like. In this scenario, for better lighting, the user usually requires lighting with a flash facing down. Therefore, after it is detected that the user taps and views an electronic ticket and a view time matches an effective time range of the electronic ticket, if a terminal detects, by using an acceleration sensor, that the terminal is at a specific tilt angle, for example, a horizontal tilt angle is 0 to 30 degrees, the terminal may determine that the user is looking down by using the terminal, and may turn on the flash for lighting in this case. Therefore, after the acceleration sensor is added to detect the tilt angle of the mobile terminal, when a user requirement for lighting up an environment is being identified, whether the view time matches the effective time of the electronic ticket is considered, and whether a posture of holding the mobile terminal by the user is a posture of viewing the electronic ticket is also considered. This increases accuracy of identifying the user requirement for lighting up an environment.

As shown in FIG. 2, FIG. 2 shows an entire process in which a terminal controls, according to an electronic ticket, a flash to start lighting. A display screen presents an electronic movie ticket for a user to view. A processor, on the terminal, that executes the method monitors an operation of viewing the electronic movie ticket. If it is determined, by comparing a view time and an effective time range of the electronic ticket, that a movie has started, the processor, on the terminal, that executes the method reads a tilt angle detected by an acceleration sensor, to detect a hold state (horizontal hold or vertical hold) of the user, and then controls, according to the hold state, the flash to be turned on or turned off.

Correspondingly, after controlling the flash component to start lighting, the mobile terminal may further obtain a tilt angle by using the acceleration sensor, and when the tilt angle belongs to a second threshold range, controls the flash component to stop lighting.

In the foregoing example, after the flash is turned on, the user may look for a seat by holding the terminal for lighting. In this process, that is, before the user finds the seat, the user is usually in a searching state. In this case, a lighting beam of the terminal remains in an overlook state. Lighting of the flash needs to be turned off only after the user finds the seat and sits down. After the user finds the seat and sits down, the lighting beam of the terminal naturally does not need to be in the overlook state. In this case, if the user adjusts a horizontal tilt angle of the terminal to be in the second threshold range (for example, 75 to 90 degrees), the terminal automatically detects a change of the tilt angle, and stops lighting of the flash when the tilt angle enters the second threshold range. The user does not need to manually turn off the flash, and therefore, operation convenience is improved.

To further identify a user requirement for lighting up an environment, in an embodiment, before controlling the flash component to start lighting, the terminal may further obtain target location information included in the target electronic ticket information; obtain, by using a positioning system, location information of a place in which the view operation occurs; and when the location information of the place in which the view operation occurs matches the target location information, control the flash component to start lighting.

In an actual application scenario of an O2O application, a user may be late. For example, if a movie starts at 9:00 but the user is still in a traffic jam at a location 5 kilometers away from a cinema at 9:01, a behavior of viewing an electronic ticket by the user in this case should not be identified as a behavior triggering a flash to start lighting. Therefore, when the user views the electronic ticket at 9:01, a terminal may learn, by using a positioning component such as a GPS component, that a current geographical location of the user does not match a geographical location of the cinema on the electronic ticket, that is, the user has not arrived at an offline service place of the O2O application. In this case, the terminal may not control the flash component to be turned on. If the user views the electronic ticket after arriving at a cinema hall of the cinema at 9:20, the terminal turns on the flash for lighting because the terminal detects that a current location of the user is a cinema address specified on the electronic ticket.

That is, when the user requirement for lighting up an environment is being identified, whether a view time matches an effective time of the electronic ticket is considered, and whether a geographical location in which the terminal held by the user is located is in the O2O offline service place defined on the electronic ticket is also considered. This increases accuracy of identifying the user requirement for lighting up an environment.

It should be noted that, in this embodiment, the tilt angle of the terminal that is detected by the acceleration sensor on the terminal in the foregoing embodiment may also be used as a reference for determining whether to turn on the flash. That is, the flash may be automatically turned on for lighting if the view time at which the user views the electronic ticket matches the effective time of the electronic ticket, the geographical location in which the terminal is located when the user views the electronic ticket matches the O2O offline service place on the electronic ticket, and the tilt angle of the terminal is also in the first threshold range. If one of the foregoing three conditions is not met, the flash is not turned on for lighting, but the terminal is still in a continuous detecting state. Once it is detected that the foregoing three conditions are met, the flash is automatically turned on for lighting. Whether the user has a requirement for turning on the flash for lighting is identified according to the foregoing multiple conditions such as the view time, the geographical location of the terminal, and the tilt angle of the terminal. Therefore, a time for automatically turning on the flash is more accurate and better adapts to a user requirement, improving user experience.

Further, after detecting the view operation of the electronic ticket information, the terminal may further present the target electronic ticket information on the display screen, and when it is detected that a virtual button is triggered, control the flash component to start lighting, where the virtual button is disposed in a presentation area on the display screen for the target electronic ticket information.

Referring to FIG. 3, FIG. 3 shows an application scenario in which a user views an electronic movie ticket. In this application scenario, a virtual button may be set in a presentation area of detailed electronic movie ticket information. The virtual button is an icon, in FIG. 3, in which a flashlight icon and text "Tap here to start lighting" are located. When the user taps the virtual button, the virtual button is triggered, and the terminal may control a flash component to start lighting.

Figure 4:
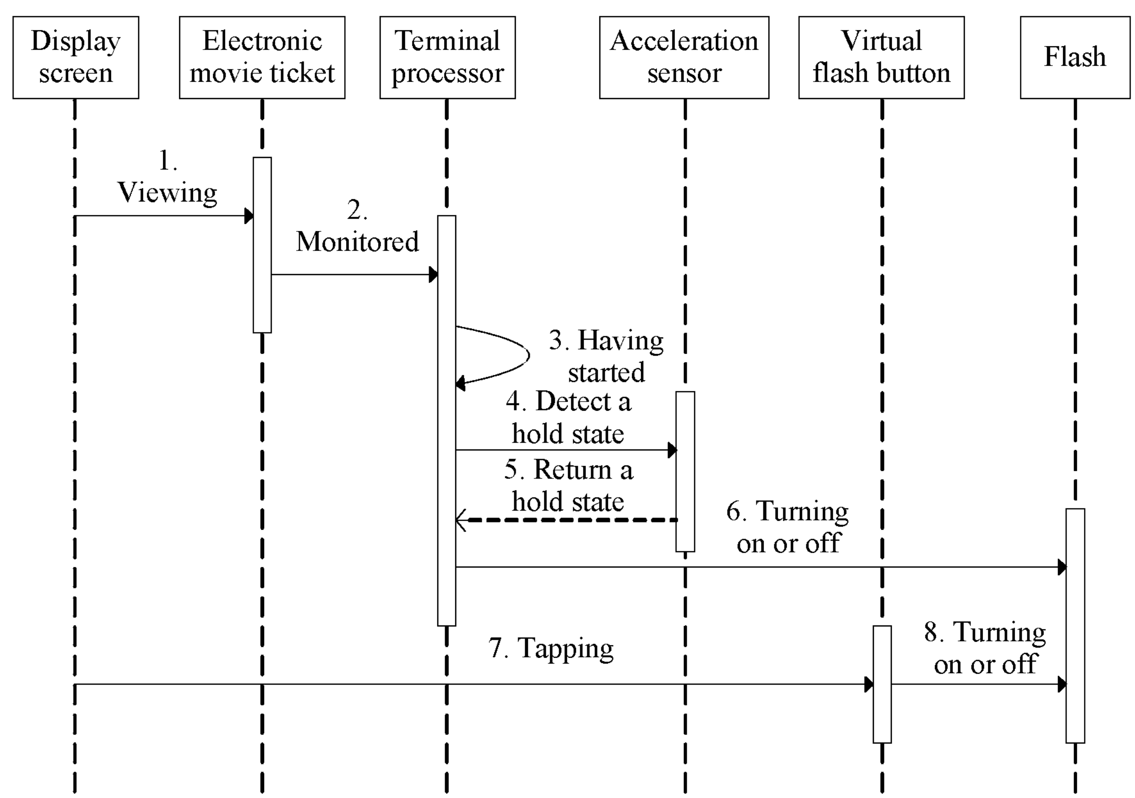
FIG. 4 is a time sequence diagram of a process of obtaining a hold state by using an acceleration sensor and controlling a flash according to the hold state according to an embodiment of the present invention.

That is, the virtual button capable of controlling the flash component on the terminal to be turned on is set in the presentation area on a display screen of electronic ticket information, so that the display screen of the electronic ticket information has an interface for directly controlling the flash. If the user has a requirement for turning on the flash, the user may directly tap the virtual button, and does not need to perform complex operations, for example, switching to a system flashlight application, and then turn on the flash. This improves operation convenience. Correspondingly, referring to FIG. 4, FIG. 4 shows an entire process in which a user controls, by tapping (step 7) a virtual button on a display screen presenting an electronic ticket, a flash to be turned on or turned off (step 8). That is, the display screen of the electronic ticket may also provide a virtual button, such as an icon or a button component, for controlling the flash to be turned on or turned off. After the user taps the virtual button, the flash may be controlled to be turned on or turned off (step 6). Therefore, the user may simultaneously view (step 1) the electronic ticket and control the flash on the same screen, and does not need to switch to another application for controlling the flash. This improves operation convenience.

Further, the terminal may further detect ambient light intensity by using an ambient light sensor, and adjust lighting luminance of the flash component according to the ambient light intensity.

An excessively bright flash may cause discomfort of eyes of a nearby user in an O2O offline service place. In addition, when lighting in the O2O offline service place is sufficient, the flash does not need to be turned on for lighting. Therefore, ambient light intensity of the O2O offline service place may be detected by using the ambient light sensor. If the ambient light intensity is relatively high, the flash does not need to be turned on. If the ambient light intensity is relatively low, lighting intensity may be increased.

Further, after controlling the flash component to start lighting, the terminal may further skip detecting a lock screen event of an operating system, and after the flash component stops lighting, resume detecting a lock screen event of the operating system.

As described above, after the flash is turned on (step 3), the user may look for a seat by holding the terminal for lighting (step 4). In this process, that is, before the user finds the seat, the user is usually in a searching state. In this case, because the user always needs to compare a seat number with information on the electronic ticket, when the user is in the searching state, that is, when the flash is in an on state, the process of presenting the electronic ticket should not be terminated, and a display screen of the electronic ticket is not switched. The operating system of the mobile terminal usually locks a screen automatically when the user performs no operation. In this case, the terminal shields a lock screen event, so that the display screen of the electronic ticket can be prevented from being hidden (step 5). This avoids a problem that the user needs to further unlock the screen before viewing the display screen of the electronic ticket again. Therefore, operation convenience is improved.

Further, after detecting the view operation of the electronic ticket information (step 2), the terminal may further broadcast the target electronic ticket information by using voice.

Screens of some mobile terminals or intelligent terminals are relatively small. Therefore, usually, text on a display screen of an electronic ticket is also relatively small, causing inconvenience for viewing key information by a user. Therefore, a terminal may automatically identify text information on the electronic ticket, and after converting the text information into speech, broadcast the text information to the user by using audio. Even if the user cannot clearly observe the electronic ticket, the user can learn content of the electronic ticket from speech broadcast. This further improves operation convenience.

Further, server programs of some O2O applications do not generate an electronic ticket of a fixed data structure; instead, content of an O2O offline service to which a user subscribes is sent, by using a service reservation SMS (SMS) message, to a terminal that the subscribing user logs in to. After receiving the SMS message, the terminal may extract and parse text content included in the SMS message, and then fill content obtained by means of parsing into a preset data structure on the terminal, to generate a local electronic ticket on the terminal. The terminal may further receive a service reservation SMS message, parse the service reservation SMS message, generate electronic ticket information according to information obtained by means of parsing, and store the electronic ticket information.

Figure 5:
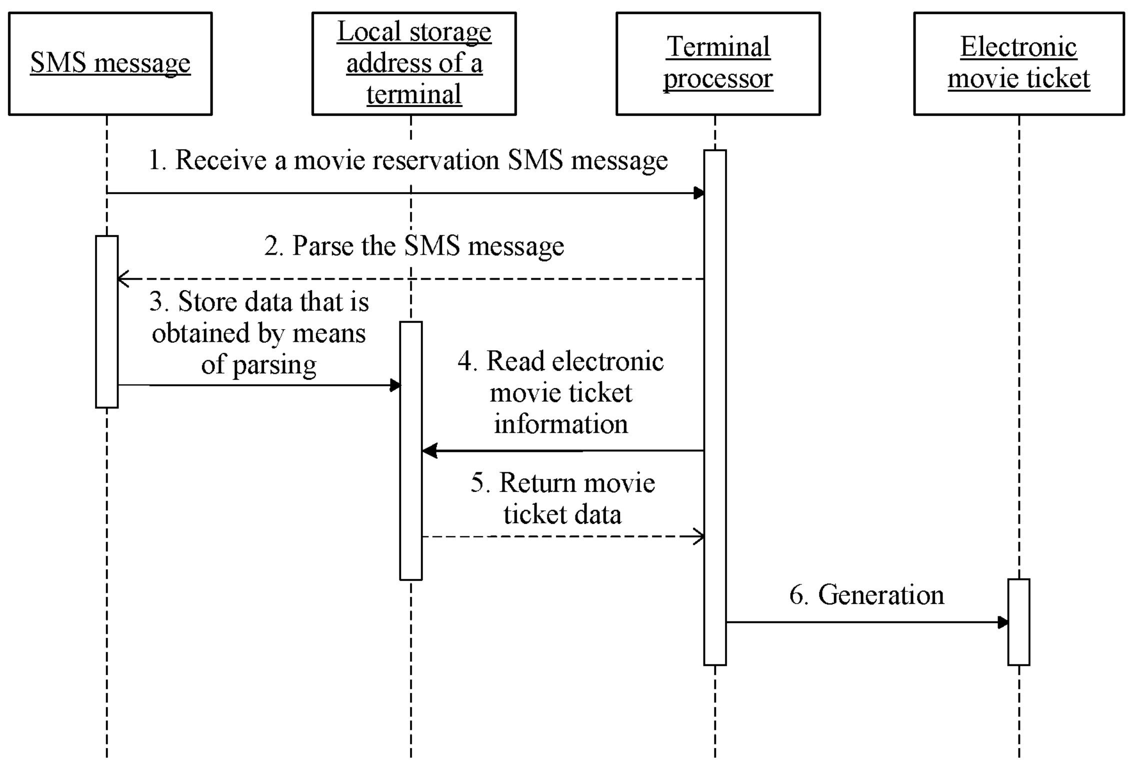
FIG. 5 is a time sequence diagram of a process in which a terminal generates an electronic ticket according to a received service reservation SMS message of an O2O application according to an embodiment of the present invention.

As shown in FIG. 5, FIG. 5 shows an entire process in which a terminal generates an electronic ticket by parsing an SMS message. For example, if content of a subscription success SMS message received by a user (step 1) is: "Dear xxx, the movie ticket with a specific seat that you subscribed to on the xx application for Captain America: Civil War in cinema hall no. 6 of China Film Cinema (OCT Harbour) during 9:00 AM to 11:00 AM on Feb. 1, 2016 has been successfully issued. Your credential is 123456. Please show it to the staff in the cinema", corresponding information may be obtained by means of parsing (step 2) and then stored in a preset data structure (step 3) to generate an electronic ticket (step 6). In this data structure, an attribute value of an effective time range attribute is 9:00 AM to 11:00 AM on Feb. 1, 2016, an attribute value of a cinema attribute is China Film Cinema (OCT Harbour), an attribute value of a cinema hall attribute is 6, an attribute value of a movie name attribute is Captain America: Civil War, and an attribute value of an electronic credential attribute is 123456. In addition, the electronic ticket of the data structure (step 5) may be further written into an xml file in a preset format for permanent storage. When loading the data structure or reading a corresponding xml file, a local O2O application client program or browser program, an instant messaging application, or a social network application may obtain the corresponding electronic ticket (step L. Therefore, by identifying an SMS message and generating a corresponding local electronic ticket on a terminal, the terminal can adapt to various O2O applications. Therefore, the flash control method may be executed on more terminals.

Further, a corresponding scheduled notification task is generated according to the stored electronic ticket information. A notification time of the scheduled notification task is a moment that is preset duration ahead of an effective time of the electronic ticket information corresponding to the scheduled notification task. Notification content of the scheduled notification task is to indicate that the electronic ticket information is to take effect. Notification is performed according to the scheduled notification task if it is determined that the notification time of the scheduled notification task arrives.

As described above, for an O2O application in which subscription information of an offline service is transferred by using an SMS message, a local electronic ticket is generated by the terminal and is cached locally on the terminal. In an application scenario in which an O2O application generates an electronic ticket, the terminal may alternatively download, from a server, an electronic ticket corresponding to a login user, and cache the electronic ticket on the terminal. The terminal may generate, according to stored electronic ticket information, a scheduled notification task of an O2O application or an operating system. For example, if the stored electronic ticket information is A, B, and C, where an effective time of A is 9:00, an effective time of B is 10:00, an effective time of C is 11:00, and preset duration before the effective time is 15 minutes (that is, a reminder is generated 15 minutes ahead), a notification time of a generated scheduled notification task corresponding to the electronic ticket information A is 9:15, a notification time of a scheduled notification task corresponding to the electronic ticket information B is 10:15, and a notification time of a scheduled notification task corresponding to the electronic ticket information C is 11:15. When detecting that a system time reaches 9:15, the terminal may display prompt information in a notification bar or a pop-up window. Content of the prompt information may be notifying a user that the electronic ticket A is to take effect. In addition, the terminal may also display, in notification information to a user, related information of the electronic ticket A, such as a geographical location and a seat number. Similarly, when detecting that the system time reaches 10:15, the terminal notifies the user that the electronic ticket B is to take effect. The foregoing manner is used to notify the user of the effective time of the electronic ticket information ahead of time. This can remind the user not to be late when the user uses an O2O service. The user does not need to always pay attention to or view the electronic ticket, and therefore, operation convenience is improved.

Figure 6:
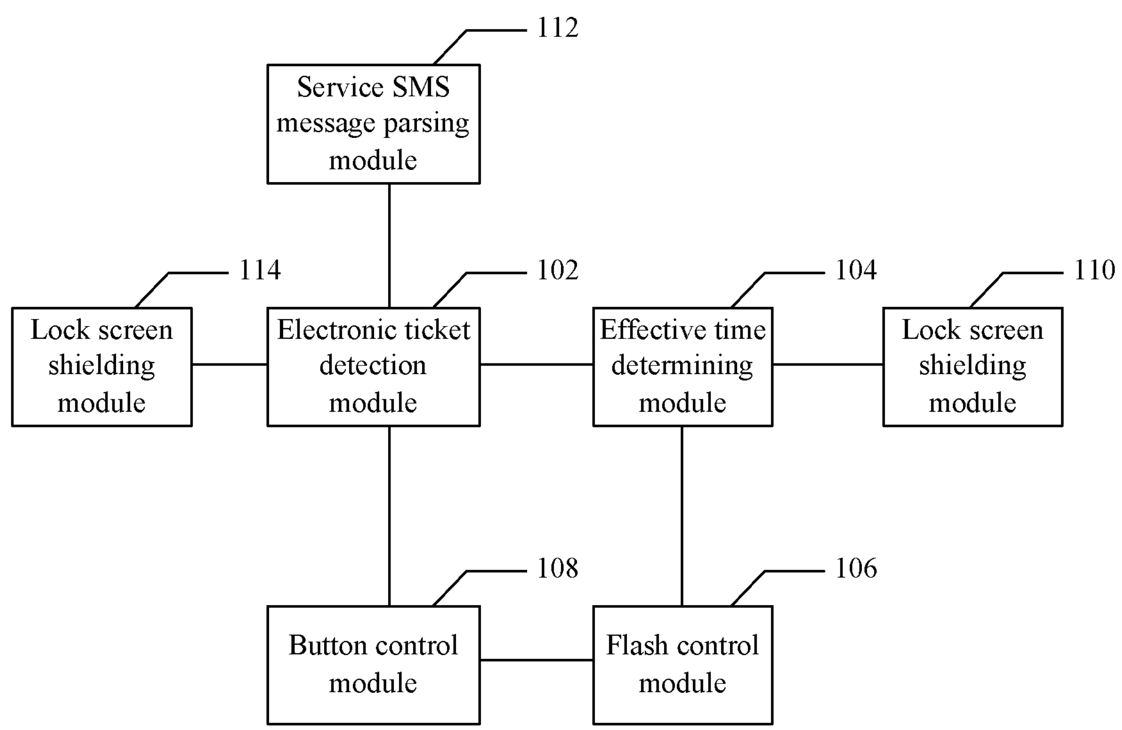
FIG. 6 is a schematic diagram of a flash control apparatus according to an embodiment of the present invention.

To resolve the foregoing problem in the conventional technology that a flash operation is not convenient enough because a user needs to start a flash control application before turning on a flash, a flash control apparatus is particularly provided. Specifically, as shown in FIG. 6, the flash control apparatus includes an electronic ticket detection module 102, an effective time determining module 104, and a flash control module 106.

The electronic ticket detection module 102 is configured to: detect a view operation of electronic ticket information, and obtain a view time of the view operation and corresponding target electronic ticket information.

The effective time determining module 104 is configured to obtain an effective time range included in the target electronic ticket information.

The flash control module 106 is configured to: if it is determined that the view time matches the effective time range, control a flash component to start lighting.

Optionally, in an embodiment, the flash control module 106 is further configured to: detect a tilt angle by using an acceleration sensor, and if it is determined that the tilt angle belongs to a first threshold range and the view time matches the effective time range, execute the controlling a flash component to start lighting.

Optionally, in an embodiment, the flash control module 106 is further configured to: detect a tilt angle by using the acceleration sensor, and if it is determined that the tilt angle belongs to a second threshold range, control the flash component to stop lighting.

Optionally, in an embodiment, the flash control module 106 is further configured to: obtain target location information included in the target electronic ticket information; obtain, by using a positioning system, location information of a place in which the view operation occurs; and execute the controlling a flash component to start lighting if it is determined that the location information of the place in which the view operation occurs matches the target location information and the view time matches the effective time range.

Optionally, in an embodiment, as shown in FIG. 6, the apparatus further includes a button control module 108, configured to: present the target electronic ticket information on a display screen, and when it is detected that a virtual button is triggered, control the flash component to start lighting, where the virtual button is disposed in a presentation area on the display screen for the target electronic ticket information.

Optionally, in an embodiment, the flash control module 106 is further configured to: detect ambient light intensity by using an ambient light sensor, and adjust lighting luminance of the flash component according to the detected ambient light intensity.

Optionally, in an embodiment, as shown in FIG. 6, the apparatus further includes a lock screen shielding module 110, configured to: skip detecting a lock screen event of an operating system, and after the flash component stops lighting, resume detecting a lock screen event of the operating system.

Optionally, in an embodiment, the electronic ticket detection module 102 is further configured to broadcast the target electronic ticket information by using voice.

Optionally, in an embodiment, as shown in FIG. 6, the apparatus further includes a service SMS message parsing module 112, configured to: receive a service reservation SMS message, parse the service reservation SMS message, generate the electronic ticket information according to information obtained by means of parsing, and store the electronic ticket information.

Optionally, in an embodiment, as shown in FIG. 6, the apparatus further includes an expiration notification module 114, configured to: generate a corresponding scheduled notification task according to the stored electronic ticket information, where a notification time of the scheduled notification task is a moment that is preset duration ahead of an effective time of the electronic ticket information corresponding to the scheduled notification task, and notification content of the scheduled notification task is to indicate that the electronic ticket information is to take effect; and perform notification according to the scheduled notification task if it is determined that the notification time of the scheduled notification task arrives.

To sum up, implementation of the embodiments of the present invention has the following beneficial effects:

In the foregoing flash control method and apparatus, the user requirement for turning on the flash is determined based on the electronic ticket of the O2O application and by detecting an operation of viewing the electronic ticket by the user; when the view time belongs to the effective time range of the electronic ticket, the flash is automatically controlled to be turned on, and the user does not need to perform complex operations of switching to a flash application and then tapping a button to turn on the flash. Therefore, operation steps are reduced, and operation convenience is improved.

Figure 7:
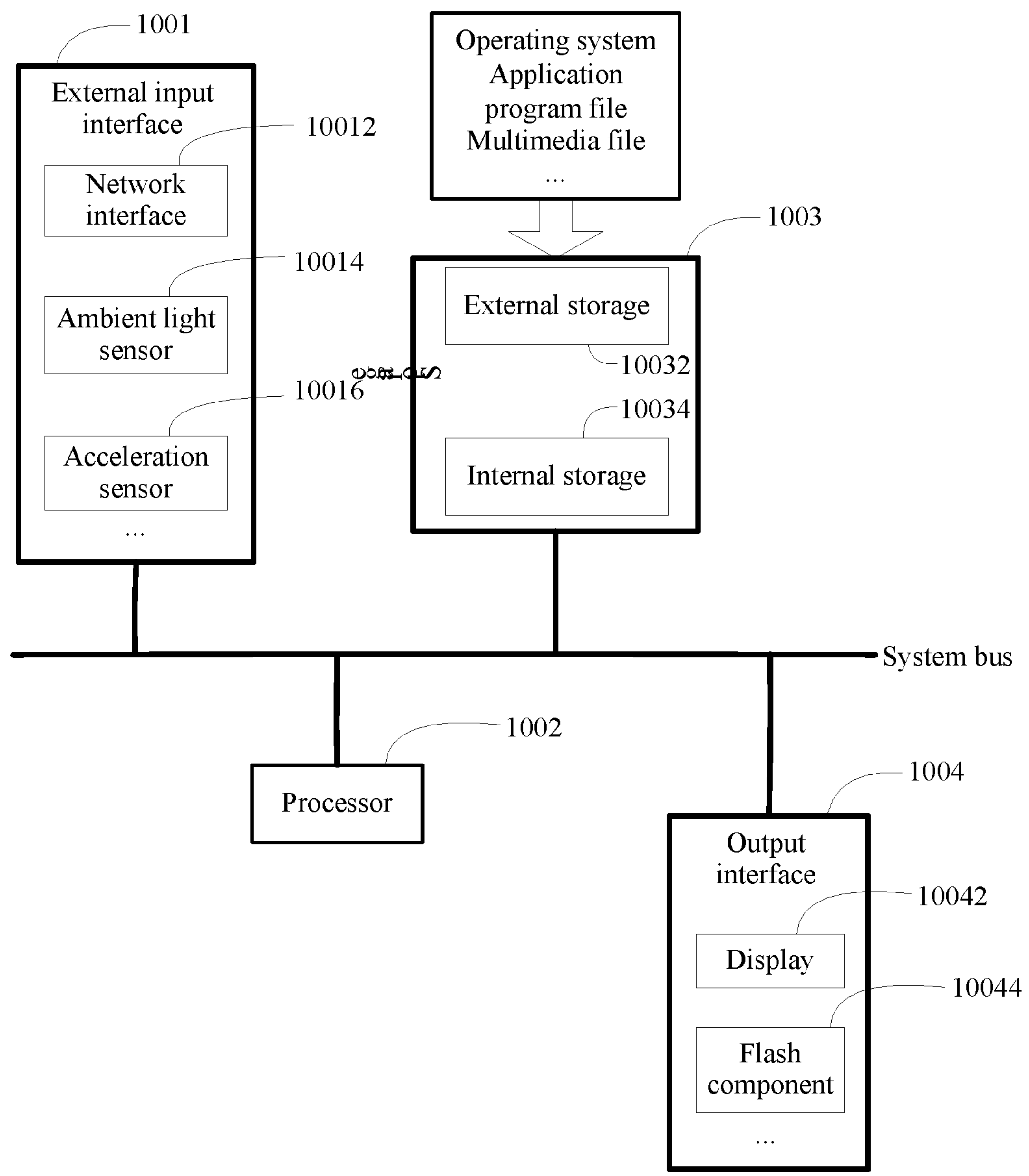
FIG. 7 is a schematic structural diagram of a computer device that runs the foregoing flash control method according to an embodiment of the present invention.

In an embodiment, as shown in FIG. 7, FIG. 7 shows a terminal 10 that runs the foregoing flash control method and that is of a computer system based on a Von Neumann system. The computer system may be a terminal device such as a smartphone, a tablet computer, a palmtop computer, a notebook computer, or a personal computer. Specifically, the computer system may include an external input interface 1001, a processor 1002, a storage 1003, and an output interface 1004 that are connected by using a system bus. Optionally, the external input interface 1001 may at least include a network interface 10012, an ambient light sensor 10014, and an acceleration sensor 10016. The storage 1003 may include an external storage 10032 (such as a hard disk, an optical disc, or a floppy disk) and an internal storage 10034. The output interface 1004 may at least include devices such as a display 10042 and a flash component 10044.

In this embodiment, the method runs based on a computer program. A program file of the computer program is stored in the external storage 10032 of the computer system 10 based on the Von Neumann system. The program file is loaded to the internal storage 10034 during running, and is then compiled into a machine code. The machine code is transferred to the processor 1002 for execution. Therefore, an electronic ticket detection module 102, an effective time determining module 104, a flash control module 106, a button control module 108, a lock screen shielding module 110, a service SMS message parsing module 112, and an expiration notification module 114 are logically formed in the computer system 10 based on the Von Neumann system.

In addition, the processor 1002 is configured to invoke program code stored in the storage 1003, to perform the following operations: detecting a view operation of electronic ticket information, and obtaining a view time of the view operation and corresponding target electronic ticket information; obtaining an effective time range included in the target electronic ticket information; and if it is determined that the view time matches the effective time range, controlling the flash component to start lighting.

In this embodiment of the present invention, the processor 1002 of the terminal 10 is further configured to perform the following operations: detecting a tilt angle by using the acceleration sensor 10016, and if it is determined that the tilt angle belongs to a first threshold range and the view time matches the effective time range, executing the controlling the flash component 10044 to start lighting.

In this embodiment of the present invention, the processor 1002 of the terminal 10 is further configured to perform the following operations: detecting a tilt angle by using the acceleration sensor, and if it is determined that the tilt angle belongs to a second threshold range, controlling the flash component to stop lighting.

In this embodiment of the present invention, the processor 1002 of the terminal 10 is further configured to perform the following operations: obtaining target location information included in the target electronic ticket information; obtaining, by using a positioning system, location information of a place in which the view operation occurs; and executing the controlling the flash component to start lighting if it is determined that the location information of the place in which the view operation occurs matches the target location information and the view time matches the effective time range.

In this embodiment of the present invention, the processor 1002 of the terminal 10 is further configured to perform the following operations: presenting the target electronic ticket information on a display screen, and when it is detected that a virtual button is triggered, controlling the flash component to start lighting, where the virtual button is disposed in a presentation area on the display screen for the target electronic ticket information.

In this embodiment of the present invention, the processor 1002 of the terminal 10 is further configured to perform the following operations: detecting ambient light intensity by using the ambient light sensor 10014, and adjusting lighting luminance of the flash component 10044 according to the detected ambient light intensity.

In this embodiment of the present invention, the processor 1002 of the terminal 10 is further configured to perform the following operations: skipping detecting a lock screen event of an operating system, and after the flash component stops lighting, resuming detecting a lock screen event of the operating system.

In this embodiment of the present invention, the processor 1002 of the terminal 10 is further configured to perform the following operation: broadcasting the target electronic ticket information by using voice.

In this embodiment of the present invention, the processor 1002 of the terminal 10 is further configured to perform the following operations: receiving a service reservation SMS message, parsing the service reservation SMS message, generating the electronic ticket information according to information obtained by means of parsing, and storing the electronic ticket information.

In this embodiment of the present invention, the processor 1002 of the terminal 10 is further configured to perform the following operations: generating a corresponding scheduled notification task according to the stored electronic ticket information, where a notification time of the scheduled notification task is a moment that is preset duration ahead of an effective time of the electronic ticket information corresponding to the scheduled notification task, and notification content of the scheduled notification task is to indicate that the electronic ticket information is to take effect; and performing notification according to the scheduled notification task if it is determined that the notification time of the scheduled notification task arrives.

In addition, in the foregoing process of executing the flash control method, input parameters are all received by using the external input interface 1001, transferred to and cached in the storage 1003, and then input into the processor 1002 for processing. Processing result data is cached in the storage 1003 for subsequent processing, or is transferred to the output interface 1004 for output.

A person of ordinary skill in the art may understand that all or some of the processes of the methods in the embodiments may be implemented by a computer program instructing relevant hardware. The program may be stored in a computer readable storage medium. When the program runs, the processes in the method embodiments may be included. The foregoing storage medium may be a magnetic disk, an optical disc, a read-only memory (Read-Only Memory, ROM), a random access memory (Random Access Memory, RAM), or the like.

What is disclosed above is merely examples of embodiments of the present invention, and certainly is not intended to limit the scope of the claims of the present invention. Therefore, equivalent variations made in accordance with the claims of the present invention shall fall within the scope of the present invention.

What is claimed is:

1. A flash control method, comprising:

detecting a view operation of electronic ticket information;

obtaining a view time of the view operation and a corresponding target electronic ticket information;

obtaining an effective time range from the target electronic ticket information; and when the view time matches the effective time range, controlling a flash component to start lighting.

2. The flash control method of claim 1, wherein before controlling the flash component to start lighting, the method further comprising:

detecting a first tilt angle with an acceleration sensor; and when the first tilt angle is associated with a first threshold range and the view time matches the effective time range, controlling the flash component to start lighting.

3. The flash control method of claim 2, wherein after controlling the flash component to start lighting, the method further comprising:

detecting a second tilt angle with the acceleration sensor; and when the second tilt angle is associated with a second threshold range, controlling the flash component to stop lighting.

4. The flash control method of claim 3, wherein before controlling the flash component to start lighting, the method further comprising:

obtaining target location information from the target electronic ticket information;

obtaining, by using a positioning system, location information of a location of the view operation; and controlling the flash component to start lighting when the location information matches the target location information and the view time matches the effective time range.

5. The flash control method of claim 3, wherein before detecting the view operation of the electronic ticket information, the method further comprising:

receiving a service reservation short message service (SMS) message and parsing the service reservation SMS message to obtain parsing information;

generating the electronic ticket information according to the parsing information; and storing the electronic ticket information.

6. The flash control method of claim 4, wherein the method further comprises:

generating a corresponding scheduled notification task according to the electronic ticket information, a notification time of the scheduled notification task being a moment that is a preset duration ahead of an effective time of the electronic ticket information corresponding to the scheduled notification task, and notification content of the scheduled notification task indicating that the electronic ticket information is to take effect; and performing notification according to the scheduled notification task when the notification time of the scheduled notification task has arrived.

7. The flash control method of claim 2, wherein after detecting the view operation of electronic ticket information, the method further comprising broadcasting the target electronic ticket information using voice information.

8. The flash control method of claim 1, wherein after detecting the view operation of the electronic ticket information, the method further comprising:

presenting the target electronic ticket information on a display screen; and when detecting that a virtual button is triggered, controlling the flash component to start lighting, the virtual button being disposed in a presentation area on the display screen for the target electronic ticket information.

9. The flash control method of claim 8, wherein controlling the flash component to start lighting comprises:

detecting ambient light intensity with an ambient light sensor; and adjusting lighting luminance of the flash component according to the ambient light intensity detected.

10. The flash control method of claim 1, wherein after controlling the flash component to start lighting, the method further comprising:

skip detecting a lock screen event of an operating system; and after the flash component stops lighting, resume detecting a lock screen event of the operating system.

11. A terminal, comprising:

a network interface;

a processor coupled to the network interface;

a storage coupled to the processor and storing program code; and a flash component coupled to the network interface and the processor; the processor configured to invoke the program code to cause the processor to:

detect a view operation of electronic ticket information, and obtaining a view time of the view operation and corresponding target electronic ticket information;

obtain-an effective time range comprised in the target electronic ticket information; and when the view time matches the effective time range, control the flash component to start lighting.

12. The terminal of claim 11, further comprising an acceleration sensor, the program code further causing the processor to be configured to:

detect a first tilt angle with the acceleration sensor; and when the first tilt angle belongs to a first threshold range and the view time matches the effective time range, control the flash component to start lighting.

13. The terminal of claim 12, wherein the program code further causes the processor to be configured to:

detect a second tilt angle with the acceleration sensor; and when the second tilt angle is in a second threshold range, controlling the flash component to stop lighting.

14. The terminal of claim 13, wherein the program code further causes the processor to be configured to:

present the target electronic ticket information on a display screen; and when detecting that a virtual button is triggered, control the flash component to start lighting, the virtual button being disposed in a presentation area on the display screen for the target electronic ticket information.

15. The terminal of claim 14, wherein the program code further causes the processor to be configured to:

skip detecting a lock screen event of an operating system; and after the flash component stops lighting, resume detection of a lock screen event of the operating system.

16. The terminal of claim 15, wherein the program code further causes the processor to be configured to:

receive a service reservation short message service (SMS) message;

parse the service reservation SMS message to obtain parsing information;

generate the electronic ticket information according to the parsing information; and storing the electronic ticket information.

17. The terminal of claim 12, wherein the program code further causes the processor to be configured to:

obtain target location information from the target electronic ticket information;

obtain, by using a positioning system, location information of a location of the view operation; and controlling the flash component to start lighting when the location information matches the target location information and the view time matches the effective time range.

18. The terminal of claim 17, wherein the terminal further comprises an ambient light sensor, the program code further causes the processor to be configured to:

detect ambient light intensity with the ambient light sensor; and adjust lighting luminance of the flash component according to the ambient light intensity detected.

19. The terminal according to claim 18, wherein the program code further causes the processor to be configured to broadcast the target electronic ticket information using voice information.

20. The terminal according to claim 19, wherein the program code further causes the processor to be configured to:

generate a corresponding scheduled notification task according to the electronic ticket information, a notification time of the scheduled notification task being a moment that is a preset duration ahead of an effective time of the electronic ticket information corresponding to the scheduled notification task, and notification content of the scheduled notification task indicating that the electronic ticket information is to take effect; and performing notification according to the scheduled notification task when the notification time of the scheduled notification task has arrived.

* * * * *